United States Patent
Mättö

(10) Patent No.: US 6,628,296 B1
(45) Date of Patent: Sep. 30, 2003

(54) METHOD AND A DEVICE FOR PROCESSING DIGITIZED IMAGE

(75) Inventor: Juhani Mättö, Tampere (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/451,456

(22) Filed: Nov. 30, 1999

(30) Foreign Application Priority Data

Dec. 1, 1998 (FI) ................................................ 982596

(51) Int. Cl.[7] .............................. G09G 5/02; G09G 5/10
(52) U.S. Cl. ...................................... 345/605; 345/597
(58) Field of Search ................................ 345/596, 597, 345/694, 600, 605, 589, 690; 358/534, 536, 429, 456, 457, 298

(56) References Cited

U.S. PATENT DOCUMENTS

| | | | |
|---|---|---|---|
| 5,479,594 A | 12/1995 | Lum | 395/143 |
| 5,777,599 A | 7/1998 | Poduska, Jr. | 345/136 |
| 5,831,626 A * | 11/1998 | Sano et al. | 345/431 |
| 6,084,560 A * | 7/2000 | Miyamoto | 345/89 |

OTHER PUBLICATIONS

Wells, S.C. Williamson, G.J. Carrie, S.E., Dithering for 12–bit true–color graphics, Sep. 1991, Computer Graphics and Application, IEEE, vol.: 11, Issue: 5, pp. 18–29.*

* cited by examiner

Primary Examiner—Jeffery Brier
(74) Attorney, Agent, or Firm—Perman & Green, LLP

(57) ABSTRACT

A method and equipment implementing the method for processing digital image information. The image information consists of a bit stream comprising a first set of successive source values, for which a corresponding output value can be determined. In the method it is read a source value, and it is determined an output value corresponding to the source value. Further, it is determined a residual part corresponding to the difference between the source value and the output value; it is calculated the sum of said residual part and the next source value; said sum is used as the next source value as a response to said sum being lower than or equal to a predetermined threshold value. The invention provides a fast colour dithering method for such solutions in which the processing time of an image is desired to be the shortest possible.

15 Claims, 2 Drawing Sheets

METHOD AND A DEVICE FOR PROCESSING DIGITIZED IMAGE

FIELD OF THE INVENTION

The present invention relates to a method for processing digitized image information, the image information consisting of a bit stream comprising a first set of successive source values, for which a corresponding output value can be defined. The invention also relates to a image processing device utilizing the method and to storing means for implementing the method using the image processing device.

BACKGROUND OF THE INVENTION

A digitized image is typically presented as an image matrix, the elements of the matrix being the values of pixels. The current value given to each pixel determines the outputting of a pixel and the image can be edited by processing the values of the pixels. For example, in a conventional sweep display an image is saved in a buffer and the display is refreshed with the information in the buffer at a certain frequency in order to produce a visibly continuous display.

The value of a pixel typically consists of one or more components. For colour displays it has been specified several colour co-ordinate systems suitable for various purposes, but in the currently used systems the value of a pixel often consists of three components that correspond for example the three basic colour components, red, green and blue. In the widely used JPEG-algorithm (Joint Photographic Experts Group) the three components of a pixel in an RGB image are presented with the accuracy of eight bits, due to which the colour selection of a JPEG image comprises $2^{24}$~16 million different colours.

The large number of available colours facilitates an accurate output result, if required, but in all connections and devices it is not sensible, nor always even possible to support such a high number of colours. For example, in simple and/or small size displays an acceptable output is achieved also using a small number of colours. For example, for some applications of mobile, portable terminals 4096 colours is currently proposed to be a suitable number.

Mapping the original values into available values is a recognised problem, and in order to solve it, particularly in colour outputting, several different methods have been suggested. Good results have been achieved using dithering, where also the values of adjoining pixels are taken into account when defining the values of a pixel. The final output, achieved by using detailed algorithms, is often excellent, but then also the processing typically takes a relatively long time. For paper outputs and various overhead outputs the processing time is not a very significant factor, because users normally accept longer processing times even when more powerful equipment is used, as long as the printout is good.

In interactive image transfer, however, the processing time has a significant effect. A received image has to be promptly output in a display, and the use of prior art complicated dithering algorithms is often not possible. In the present image transfer tests a pixel value has typically been defined using simple truncations. The output result achieved using even this method is mainly acceptable, but for some images a need for improvement has been observed. Particularly in images containing shading, there are clearly distinguishable, undesirable lines around objects (Moire-effect).

Reference publication U.S. Pat. No. 5,777,599 presents a image processing means, in which it has been striven for to simplify the dithering process in order to speed up the processing. In dithering it is generally used a mask matrix, to the values of which the truncated part is compared, and based upon the comparisons the untruncated integer value is increased or decreased. In the solution of the reference publication the part to be truncated is added to the value of the mask matrix, it is checked whether the obtained value is higher than one, and if it is, the integer value of the pixel is incremented by one. By using the solution the comparing of a mask value and the truncated part to each other is avoided and by intelligent choosing of the mask values an overflow check is avoided. In the solution of the reference publication dithering is carried out separately for various components, for example in this case separately for the colour components, and the mask matrix used in the dithering is determined based upon the position of a pixel. Such solutions require arrangements for the processing of the position data of pixels and for mask matrix management, which typically slows down the processing and makes it more complicated.

Reference publication U.S. Pat. No. 5,479,594 presents a image processing method, in which method for each component part of a source pixel successively adding a truncation error of an immediately preceding previous pixel component, truncating a resulting value to form a truncation error and most significant bits, and providing the most signicant bits to a destination line. In the solution of the reference publication, alike the other present solutions, dithering is carried out separately for various components, for example separately for each colour component. This adds the circuitry needed, because every component needs its own circuitry, and makes the system more complex and costly. It also might worsen the resolution of the picture in some cases by reducing the contrast difference between adjacent pixels compared to the original one, by taking large truncation errors from each color component of the first pixel and adding these to the second pixel.

Now a new method for processing image information has been invented, by using which method the effect of the above described problems can be significantly reduced. The method according to the invention facilitates fast dithering and thus significantly improves image quality in such devices, in which the time taken by image processing has significance. The method is easy to implement and simple, and thus by using it image quality can be improved without causing any significant delay in the processing time nor causing a need to enhance the performance or memory capacity of a device. This is particularly important in devices, where size, memory capacity and/or performance is limited for example due to a device being portable, wireless or for other corresponding reasons. Such devices include for example PDA-devices (Personal Digital Assistant), communicators and mobile stations.

SUMMARY OF THE INVENTION

A method according to the invention is characterized in determining a residual part corresponding to the difference between a source value and an output value; calculating the sum of said residual part and the next source value; using said sum as the next source value as a response to said sum being lower than or equal to the predetermined threshold value; using the determined value as the next source value as a response to said sum being higher than the predetermined threshold value; and calculating the said sum on basis of the determined residual part and the next source value, regardless of which source value of the output value affecting to the outputting properties is in case, the outputting of each pixel being based upon at least two output values, affecting mutually different outputting properties.

Another object of the invention is a device for displaying a digital image. The device according to the invention comprises a display comprising a number of image elements (pixels); a display driver for controlling the outputting of the pixels based upon at least one output value; and an image processing device comprising an input for receiving a bit stream comprising successive source values for outputting; a processor for processing the source values into corresponding output values; an output for supplying the output values to the display driver. The device comprises means for determining a residual part descriptive of the difference between a source value and the corresponding output value; means for calculating the sum of said residual part and the next source value and for using said sum as the next source value as a response to said sum being lower than or equal to a predetermined threshold value, and using determined value as the next source value as a response to said sum being higher than the predetermined threshold value; and means for calculating the said sum on basis of the determined residual part and the next source value, regardless of which source value of the output value affecting to the outputting properties is in case, the outputting of each pixel being based upon at least two output values, affecting mutually different outputting properties.

BRIEF DESCRIPTION OF THE DRAWINGS

The block diagram in FIG. 1 illustrates a device according to the invention used for displaying digital video image.

The block diagram in FIG. 2 illustrates the structure of a bit stream received by an image processing device.

The flow diagram in FIG. 3 illustrates the implementation of the method according to the invention in the processing of digital image.

DETAILED DESCRIPTION

Figure 1:
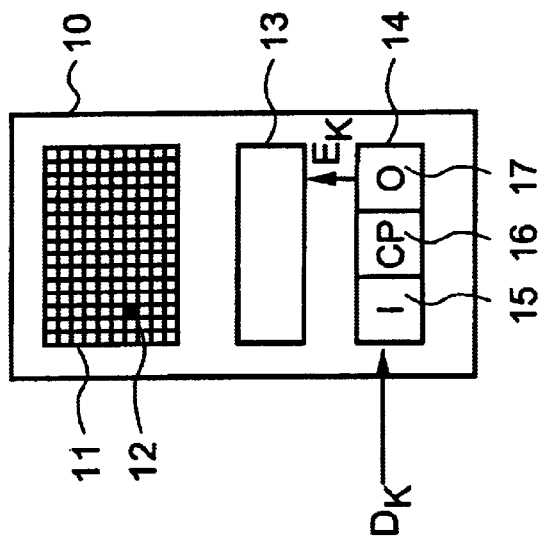

The block diagram in FIG. 1 illustrates device 10 according to the invention used for displaying a digital video image. The device comprises display 11 consisting of pixels 12 arranged in a matrix. To the display it has been connected display driver 13 that activates the outputting of a pixel according to the current value given to the pixel. The activation of a pixel can be implemented in a number of ways, prior known to a person skilled in the art, for example by sweeping over the pixels reflecting in the display with a controllably adaptable beam of particles at a certain frequency, or by directly affecting the radiation properties of the display material using a control voltage. In order to determine the current value for the pixels, device 10 also comprises image-processing device 14. The image-processing device comprises input 15, through which it has been adapted to receive a set of source values Dk. Image processing device 14 further comprises processor 16 for processing the source values into a format suited for outputting (output values Ek). Image-processing device 14 also comprises output 17, through which it has been adapted to forward processed output values Ek to display driver 13. In order to clarify the functionalities display driver 13 and image-processing device 14 are in the description of the example of FIG. 1 shown as separate units without limiting the physical structure of the device to said arrangement. It is possible to integrate components of device 10 without changing the invention.

Said device may be any device used for displaying a digital video image. The invention is particularly suitable for such solutions, in which an image is typically displayed using a lower number of colours and in which the processing time of the image has significance. These devices include for example various devices comprising a PDA-unit, in which case the image information coming to the display of the PDA-unit can be read from a memory or be received using a telecommunication interface arranged in the device utilizing a wireless or wired data transfer method.

Figure 2:
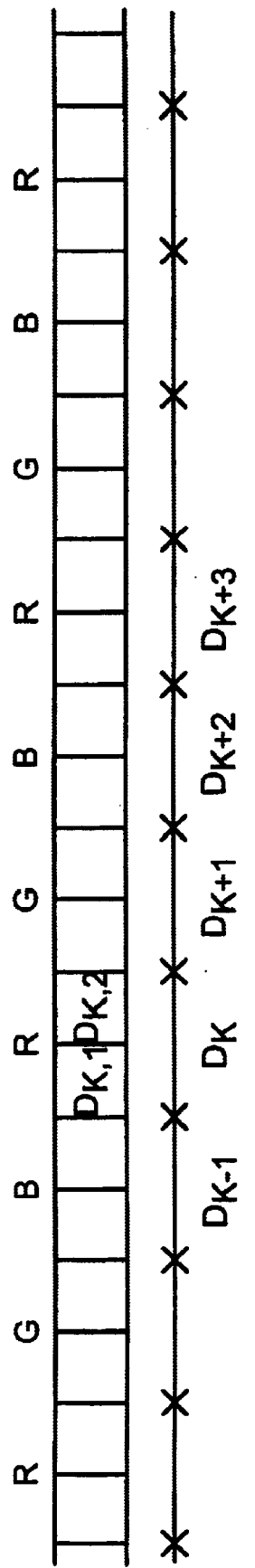

The simplified block diagram in FIG. 2 illustrates the structure of the bit stream received by input 15 of image-processing device 14. The example in the figure is based upon RGB-components, and particularly upon converting an R8G8B8-image into R4G4B4-format, but in solutions with other colours, the choice of components and the number of bits used for presenting them are equivalent forms of the invention. The bit stream related to a certain image consists of a set of successive source values Dk (k=1,2, . . . , K) that are, according to the selected coding type, mapped into the pixel values of a display matrix. For example in the coding according to FIG. 1 the source values (Dk, Dk+1, Dk+2) indicate the source values of the RGB-components (m×n=K) of pixel Pm,n. Each source value Dk comprises truncated part Dk,1 and residual part Dk,2. Truncated part Dk,1 is the part of source value Dk, based upon which output value Ek is preliminarily chosen before dithering. Residual part Dk,2 is the part of source value Dk that represents the difference between chosen output value Ek and source value Dk. In the example in FIG. 2 the output value of R8G8B8 component Ek is chosen by simply cutting off the four last bits from an 8-bit number, in which case truncated part Dk,1 corresponds to the first four bits of the source value (integer part). Residual part Dk,2 corresponds to the truncated four bits (fraction part). Prior art solutions that require fast display function, and where the use of dithering methods based upon using conventional mask matrixes is not applicable, truncated part Dk,1 is typically chosen for output value Ek.

Figure 3:
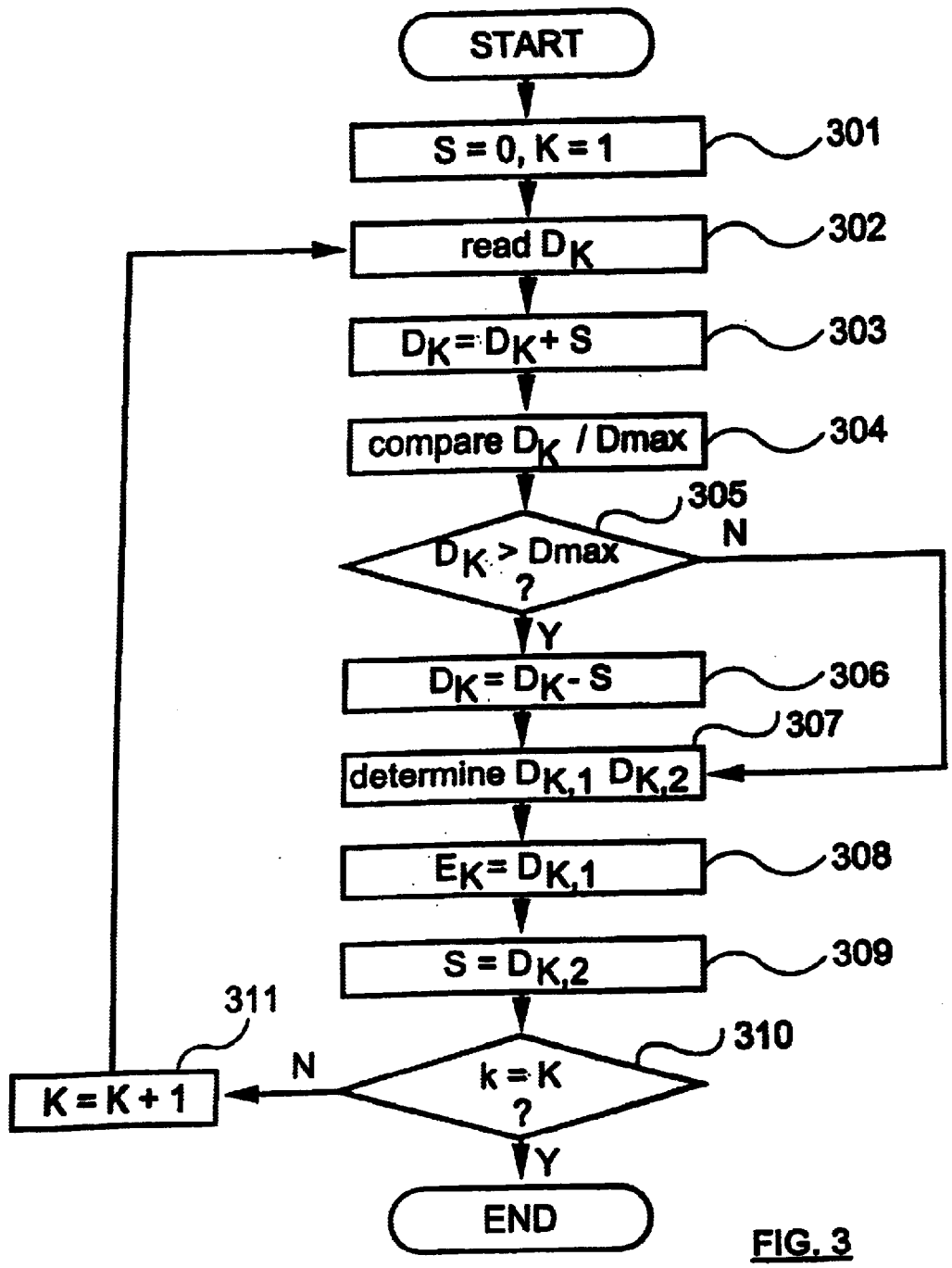

The flow diagram in FIG. 3 illustrates the implementation of the method according to the invention in the processing of digital image. The image comprises K source values Dk that are edited into outputting values Ek. The method utilizes difference value S, by using of which the difference between the source value and the output value is stored in order to be utilized when the output value corresponding to the next source value is determined. In step 301 difference value S is reset and first source value k of the image is chosen for examining. In step 302 source value Dk is read. If, for example, the R8G8B8->R4G4B4-conversion mentioned in connection with FIG. 2 is concerned, and the R8G8B8-components of the first pixel of the image matrix are R=0x1C (00011100b), G=0x1C(00011100b), b=0x1C (00011100b), the value of the R-component 0x1C is read in step 302. In step 303 difference value S is added to the source value and the obtained sum is in step 304 compared with maximum value Dmax determined for the source value. Dmax corresponds to the highest possible source value that still corresponds to the highest available outputting value, and by using it the overflow of an outputting value is prevented, which overflow could result in, for example, a bright dot being converted by dithering into fully black. If the sum of difference value S and original source value Dk is higher than maximum value Dmax, an overflow has come up, in which case the source value is restored to the original source value (step 306). Because the difference value can change the outputting value at most one colour, the original source value results in this case in the highest possible output value. A corresponding result in the case of an overflow can be arranged also in another way, for example by defining as the source value a chosen constant value corresponding to the highest outputting value. In the example maximum value Dmax is 0×FF(11111111b), corresponding to the brightest possible component value. In the first loop difference value S=0, is 0×1C<0×FF (00011100b<11111111b), and the restoration operation in step 306 is not required.

In step 307 truncated value Dk,1 and residual value Dk,2 are extracted from the source value. After this it is possible to define output value Ek based upon truncated value Dk,1 (step 308) and residual value Dk,2 is stored as difference value S (step 309). When the source value has been processed it is checked whether all source values have been processed (step 310), and if yes, the image processing ends. If no, the next source value is selected for examining (step 311).

In the example case the summed source value of the R8-component is D1=0×1C(00011100b), in which case D1,1=0×01(0001b) and D1,2=0×0C(1100b), and thus first output value E1=0×01(0001b), and difference value S=0× 0C(1100b). At the G-component, to begin with, D2=0×1C (0001110b), and after the summing operation D2=0×01C+ 0×0C=0×28 (00011100b+000011100b=00101000b), which still is lower than Dmax=0×FF. In this case D2,1=0×02 (0010b) and D2,2=0×08(10000b), second output value E2=0×02(0010b) and the difference value is set to S=0×08 (1000b). At the B-component, to begin with, D3=0×1C (00011100b), and after the summing operation D2=0×01C+ 0×08=0×24 (000111100b+00001000b=00100100b), which is lower than Dmax. Then D3,1=0×02 (00110b) and D3,2= 0×04 (01100b), third output value E3=0×02 (00110b) and at the processing of the next R-component the difference value to be used is set to S=0×04 (0100b). As the result of a processing according to the invention it is obtained as the output values of the RGB-components of the first pixel R=0×01, G=0×02, B=0×02 instead of the original R=0×01, G=0×01, B=0×01.

Figure 4:
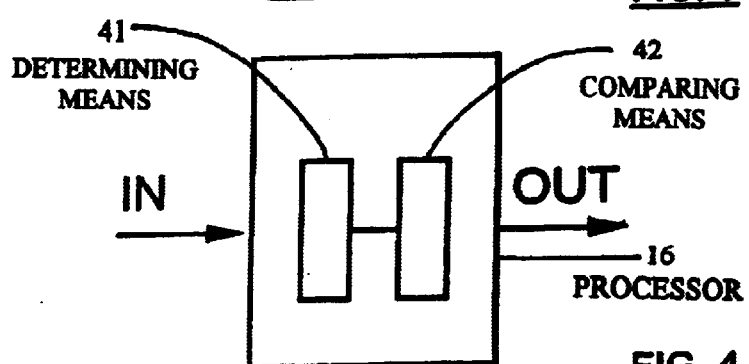
FIG. 4 shows the functional block-diagram of the processor in a device according to the invention.

FIG. 4 shows the functional block diagram of processor 16 in a device according to the invention. It is possible to implement processor 16 using one or more processors or it can be implemented using a program, in which case processor 16 executes operations according to a program stored in storing means connected fixedly or interchangeably to the device. The processor comprises determining means 41 that are arranged to determine residual part Dk,2 reflecting the difference between source value Dk and output value Ek corresponding to it. The processor also comprises calculating and comparing means 42, the means being arranged to add residual part Dk,2 and the next source value and to compare the sum with a predetermined threshold value (Dmax). If the calculated sum is lower than the predetermined threshold value, calculating and comparing means 42 have been adapted to use said calculated sum as the next source value. If the calculated sum is higher than the predetermined threshold value, calculating and comparing means 42 have been arranged to use the determined value as the next source value.

The result obtained by using the simple colour dithering according to the invention looks good, and in particular it has been possible to reduce significantly the streakiness typically connected with images containing shading. By taking into consideration the error resulting from the reduction of the number of colours directly in the next source value a great number of processing-, storing- and search operations related to the location information of a source value are avoided, and in this way it is achieved a colour dithering solution sufficiently fast for operating also in environments requiring a fast outputting function. Because in the processing essentially two successive source values are considered, the method is easily applicable to images of different types, independent of the coding- and scanning order of pixels. Thus it is also possible to choose the time of execution of the dithering operation relatively freely.

When the dithering method according to the invention is used in connection with artificial images, it is possible that streaks parallel to the update order of pixels may appear in some images. In another implementation of the invention the residual value is considered in a more inaccurate form, in which case said streak-effect is reduced. For example in the example described above residual part Di,2 was determined directly based upon the last four bits. It has been proved in practice that the result can, if required, be further adjusted by changing the accuracy of determining the residual part. Because the residual part can be simply determined by using an AND-operation, (in the first embodiment "Dk AND 0×0F"), the adjustment according to the second embodiment can be implemented by replacing in the AND-operation number 0×0F for example with number 0×0E (1110b), number 0×0C(100b) or number 0×08 (11000b), in which case the effect of the dithering according to the invention is lowest.

The above is a description of the realization of the invention and its embodiments utilizing examples. It is self evident to a person skilled in the art that the invention is not limited to the details of above embodiments and that the invention can be implemented also in other embodiments without deviating from the characteristics of the invention. The presented embodiments should be regarded as illustrating, but not limiting. Thus the possibilities to implement and use the invention are limited only by the enclosed claims. Thus different embodiments of the invention defined in the claims, also equivalent embodiments, are included in the scope of the invention.

What is claimed is:

1. A method for processing digitized image information, the image information consisting of a bit stream comprising a first set of successive source values, for which a corresponding output value can be defined, an image in accordance with the image information being formed of pixels, the method comprising:

reading a source value comprising a truncated part and a residual part;

predetermining the output value corresponding to the source value;

determining a residual part as the difference between the source value and the output value;

calculating the sum of said residual part and a next read source value;

using said sum as the next source value as a response to said sum being lower than or equal to a predetermined threshold value;

whereby, using as the next source value the next read source value as a response to said sum being higher than the predetermined threshold value; and calculating said sum on the basis of the determined residual part and the next source value, regardless of whether the source value and the next source value concern different outputting properties of the pixel, the outputting of each pixel being based upon at least two output values, affecting mutually different outputting properties.

2. A method according to claim 1, wherein using as the next source value the non-summed value of the source value as a response to said sum being higher than the predetermined threshold value.

3. A method according to claim 1, wherein using as the next source value the predetermined threshold value as a response to said sum being higher than the predetermined threshold value.

4. A method according to claim 1, wherein said predetermined threshold value is the highest possible source value corresponding to the highest possible output value.

5. A method according to claim 1, wherein the outputting of each pixel is based upon an output value affecting three different colour components and said sum is calculated based upon a determined residual value and the next source value, independent of which colour component the concerned source value has an effect upon.

6. A method according to claim 1, wherein the source values are presented in the R8G8B8-format and the output values in the R4G4B4-format, and the output values are determined based upon a four-bit truncated value determined from a source value.

7. The method of claim 1 wherein the step of predetermining the output value corresponding to the source value further comprises editing the source value into the output value.

8. The method of claim 1 wherein the step of predetermining the output value corresponding to the source value further comprises:
storing a difference between the source value and the output value; and
using the stored difference when the output value corresponding to the next source value is determined.

9. The method of claim 8 wherein the difference value is added to the source value and an obtained sum is compared with a maximum value determined for the source value.

10. The method of claim 1 wherein the step of predetermining the output value corresponding to the source value further comprises:
extracting the truncated part and the residual part from the source value; and
defining the output value based upon the truncated part, wherein the residual part is stored as a difference value.

11. The method of claim 1 wherein the step of predetermining the output value corresponding to the source value further comprises:
extracting from the source value the truncated part and the residual part;
preliminary choosing the output value as the truncated part; and
storing the residual part as the difference between the chosen output value and the source value.

12. A device for displaying a digital image, the device comprising:
a display, comprising a number of pixels;
a display driver for controlling the outputting of the pixels based upon at least one output value; and
an image processing device, comprising an input for receiving for outputting a bit stream containing successive source values each source value comprising a truncated part and a residual part; a processor for processing the source values into corresponding output values; and output for supplying the output values to the display driver; determining means for determining a residual part descriptive of the difference between a source value and the corresponding output value; means for calculating the sum of said residual part and the next source value and for using said sum as the next read source value as a response to said sum being lower than or equal to a predetermined threshold value;
wherein the device comprises;
means for using as the next source value said next read source value as a response to said sum being higher than the predetermined threshold value; and means for calculating the said sum on the basis of the determined residual part and the next source value, regardless of whether the source value and the next source value concern different outputting properties of the pixel, the outputting of each pixel being based upon at least two output values, affecting mutually different outputting properties.

13. A device according to claim 12, wherein the device comprises a wireless communication device.

14. A device according to claim 12, wherein the device comprises a PDA-unit.

15. Recording means comprising a program for processing digital image information, the image information consisting of a bit stream comprising a first set of successive source values, for which a corresponding output value can be defined, which program causes;
a processor function for reading a source value comprising a truncated part and a residual part;
a processing function for determining the output value corresponding to the source value;
a processor function for determining a residual part as the difference between the source value and the output value;
a processor function for calculating the sum of said residual part and a next read source value; and
a processor function for using said sum as the next source value as a response to said sum being lower than or equal to a predetermined threshold value;
wherein the program further causes
a processor function for using as the next source value the next read source value as a response to said sum being higher than a predetermined threshold value; and
a processor function for calculating the sum on the basis of the determined residual part and the next source value, regardless of whether the source value and the next source value concern different outputting properties of the pixel, the outputting of each pixel being based upon at least two output values, affecting mutually different outputting properties.

* * * * *